United States Patent [19]
Kanome et al.

[11] Patent Number: 5,383,834
[45] Date of Patent: Jan. 24, 1995

[54] ROLL STAMPER FOR FORMING A BASE FOR INFORMATION RECORDING MEDIUM

[75] Inventors: Osamu Kanome; Hirofumi Kamitakahara, both of Yokohama; Hitoshi Yoshino, Kawasaki; Tetsuya Sato, Kawasaki; Hisanori Hayashi, Kawasaki, all of Japan

[73] Assignee: Canon Kabushiki Kaisha, Tokyo, Japan

[21] Appl. No.: 897,747

[22] Filed: Jun. 12, 1992

[30] Foreign Application Priority Data

Jun. 14, 1991 [JP] Japan .................. 3-169028

[51] Int. Cl.⁶ .................. B21B 31/08; B21B 27/05
[52] U.S. Cl. .................. 492/25; 492/30; 492/38
[58] Field of Search .................. 492/22, 25, 30, 38, 492/45, 60; 425/194, 363, 810; 156/209, 219, 220, 278, 280, 324, 244.11; 264/1.3, 106, 107

[56] References Cited

U.S. PATENT DOCUMENTS

| | | | |
|---|---|---|---|
| 1,131,066 | 3/1915 | Kurtz-Hähnle | 162/357 |
| 1,597,250 | 8/1926 | Rowley | 492/25 X |
| 1,791,761 | 2/1931 | Larrabee | 492/22 X |
| 1,907,368 | 5/1933 | Rössger | 492/25 X |
| 2,085,093 | 6/1937 | Gauthier | 492/22 X |
| 3,880,037 | 4/1975 | Duckett et al. | 492/22 X |
| 4,187,752 | 2/1980 | Chesnut | 492/22 X |
| 5,173,313 | 12/1992 | Sato et al. | 425/183 |

FOREIGN PATENT DOCUMENTS 259541  5/1913  Germany .................. 492/22

Primary Examiner—Timothy V. Eley
Attorney, Agent, or Firm—Fitzpatrick, Cella, Harper & Scinto

[57] ABSTRACT

A roll stamper used in a process of continuously forming a uniform sheet of a resin from which information recording medium bases are obtained. This roll stamper has a stamper member having in its surface a pattern corresponding to a pre-format pattern of an information recording medium, fixing members fixed on opposite end portions of a reverse surface of the stamper member so as to be integral with the stamper member, and a specular roll base having an engagement groove formed in its circumferential surface parallel to its axis. The stamper member is fixed on the specular roll base by fitting the fixing members in the engagement groove. A recess formed in a circumferential surface of the roll stamper as a gap between the fixing members is filled with a filler so that the roll stamper circumferential surface is substantially smooth. Side surfaces of the fixing members and/or the engagement groove are shaped as to suitably retain the filler.

32 Claims, 9 Drawing Sheets

ROLL STAMPER FOR FORMING A BASE FOR INFORMATION RECORDING MEDIUM

BACKGROUND OF THE INVENTION

1. Field of the Invention

This invention relates to a roll stamper used to continuously manufacture a base for a high-density information recording medium such as an optical disk or optical card by transferring a concave and convex pre-format pattern to a base surface and to an apparatus for forming a high-density information recording medium base by using this stamper.

2. Related Background Art

A base for a high-density optical recording medium such as an optical disk or optical card can be manufactured by injection molding, compression molding or extrusion molding.

In a process of forming such recording medium base by injection molding or compression molding, strict conditions are required with respect to the temperature and the pressure of a molten resin, the precision of dies and other factors to achieve the desired flatness and smoothness of the base, to limit a warp of the base and to prevent air bubbles from mixing in the molten resin, and a large-scale molding machine is also required, resulting in an increase in manufacturing cost. In the case of injection molding, it is difficult to manufacture a base having a small thickness, 0.4 mm or less and having a small double refraction index. Further, in the case of compression molding, the productivity is low because molded sheets are separately formed one after another.

In a process of extrusion molding using an extruder, a sheet of a molten resin extruded from an extruder is pressed by a roll stamper to form a base for an information recording medium while transferring a pre-format pattern for producing a pre-format signal, a tracking signal and the like to the base. Such an extrusion molding process is therefore advantageous in terms of mass production of bases and has recently been studied as a method for forming an information recording medium base.

Roll stampers to be used to form an information recording medium base by extrusion molding as described above have conventionally been manufactured by the following methods:

(1) a method in which a pre-format pattern is directly formed in a circumferential surface of a roll base having the circumferential surface polished to form a specular surface (hereinafter referred to as "specular roll base");

(2) a method in which a flexible stamper having a pre-format pattern previously formed in its surface is uniformly bonded to a specular circumferential surface of a specular roll base with an adhesive; and (3) a method in which a flexible stamper having a pre-format pattern previously formed in its surface is fixed to a specular circumferential surface of a specular roll base with screws.

In the case of the method (1), if a defect is caused in only one portion of the pre-format, the whole roll stamper must be interchanged, and the molding efficiency is therefore low. In the roll stamper manufactured by the method (2), the adhesive is changed in quality with time by the heat of the extruded resin sheet or the heat of the roll so that the bonding force is reduced and the stamper can separate easily from the specular roll. Therefore the life of the roll stamper is very short. Moreover, air bubbles can easily be generated in the adhesive. Unnecessary irregularities in the stamper surface caused by the air bubbles are transferred to the base, so that the pattern cannot be formed accurately and there is a possibility of occurrence of transfer failure. In the case of the roll stamper manufactured by the method (3), it is difficult to limit the gap between the flexible stamper and the roll base, and non-uniformity of the temperature on the stamper surface therefore occurs easily, resulting in failure to suitably form the base. A method is therefore needed which enables a flexible stamper to be securely fixed on a specular roll base so that the stamper surface (reverse surface) in which no pre-format pattern is formed is brought into close contact with the circumferential surface of the specular roll base while occurrence of a strain in the stamper is prevented.

The assignee of the present invention has proposed a method which is disclosed in Japanese Patent Application No. 3-245330 (U.S.S. No. 658,688). In this method, fixing members are provided on reverse surface portions of a flexible stamper, while an engagement groove in which the fixing members can be fitted is formed in a circumferential surface of a roll base. The fixing members are fitted in the engagement groove to fix the flexible stamper.

In this fixing method, however, a recess 64 such as that shown in FIG. 6A or 6B is formed in the circumferential surface of the stamper between fixing members 61-1 and 61-2 as shown in FIG. 6A or between fixing member 61-3 and a wall 63 of engagement groove 62 as shown in FIG. 6B. In the case of a roll stamper arranged to enable a flexible stamper to be tensed with wedges, in particular, a comparatively large spacing is provided between each fixing member and the engagement groove as a margin for application of a tensile force to the flexible stamper, and a considerably large recess is therefore formed in the roll stamper.

If an information recording medium base is continuously formed by using a roll stamper having such a recess in an apparatus such as that shown in FIG. 7, the following problems are encountered. That is, the volume of a bank of a molten resin at a press-formed portion 73 of a molten resin sheet formed by the roll stamper 71 and a specular roll 72 facing the roll stamper 71 varies so that the thickness of the formed information recording medium base sheet is not uniform. The molten resin enters the recess to prevent the base sheet from being smoothly separated from the roll stamper, which phenomenon may badly influence the optical performance of the information recording medium base sheet. Moreover, protrusions each corresponding to the recess are formed in the surface of the information recording medium base sheet to which the pre-format pattern is transferred. If such protrusions exist, it is difficult to successively manufacture information recording medium bases from the lengthwise base sheet by, for example, continuously applying a material to form a recording layer.

SUMMARY OF THE INVENTION

The present invention has been achieved in view of the above-described problems, and an object of the present invention is to provide a roll stamper capable of forming an information recording medium base sheet which has a uniform thickness and improved optical performance inclusive of an effect of limiting birefringence, and from which an optical recording medium can be suitably produced continuously.

Another object of the present invention is to provide a manufacturing apparatus capable of continuously forming an information recording medium base sheet which has a uniform thickness and improved optical performance inclusive of an effect of limiting birefringence, and from which an optical recording medium can be suitably produced continuously.

According to the present invention, in one aspect, there is provided a roll stamper for forming an information recording medium base sheet, comprising a stamper member having in its surface a pattern corresponding to a pre-format pattern of an information recording medium, and a roll base having a circumferential surface on which the stamper member is fixed. A recess formed in a circumferential surface of the roll stamper is filled with a filler so that the roll stamper circumferential surface is substantially smooth.

According to the present invention, in another aspect, there is provided a roll stamper for forming an information recording medium base sheet, comprising a stamper member having in its surface a pattern corresponding to a pre-format pattern of an information recording medium, fixing members fixed on opposite end portions of a reverse surface of the stamper member so as to be integral with the stamper member, and a specular roll base having a plurality of engagement grooves formed in its circumferential surface parallel to its axis in which grooves the fixing member can be respectively fitted. The stamper member is fixed on the specular roll base by respectively fitting the fixing members in the engagement grooves, while being placed along the circumferential surface of the specular roll base. A recess in a circumferential surface of the roll stamper including a gap between the stampers and the engagement grooves is filled with a filler so that the roll stamper circumferential surface is substantially smooth.

According to the present invention, in yet another aspect, there is provided an apparatus for continuously manufacturing an information recording medium base, comprising means for melting and extruding a resin to form a resin sheet, a roll stamper having in its surface a pattern corresponding to a pre-format pattern, and a specular roll disposed so as to face the roll stamper. The roll stamper has a recess in its circumferential surface filled with a filler so that its circumferential surface is substantially smooth.

DESCRIPTION OF THE PREFERRED EMBODIMENTS

The present invention will be described below in detail with reference to the accompanying drawings.

Figure 1:
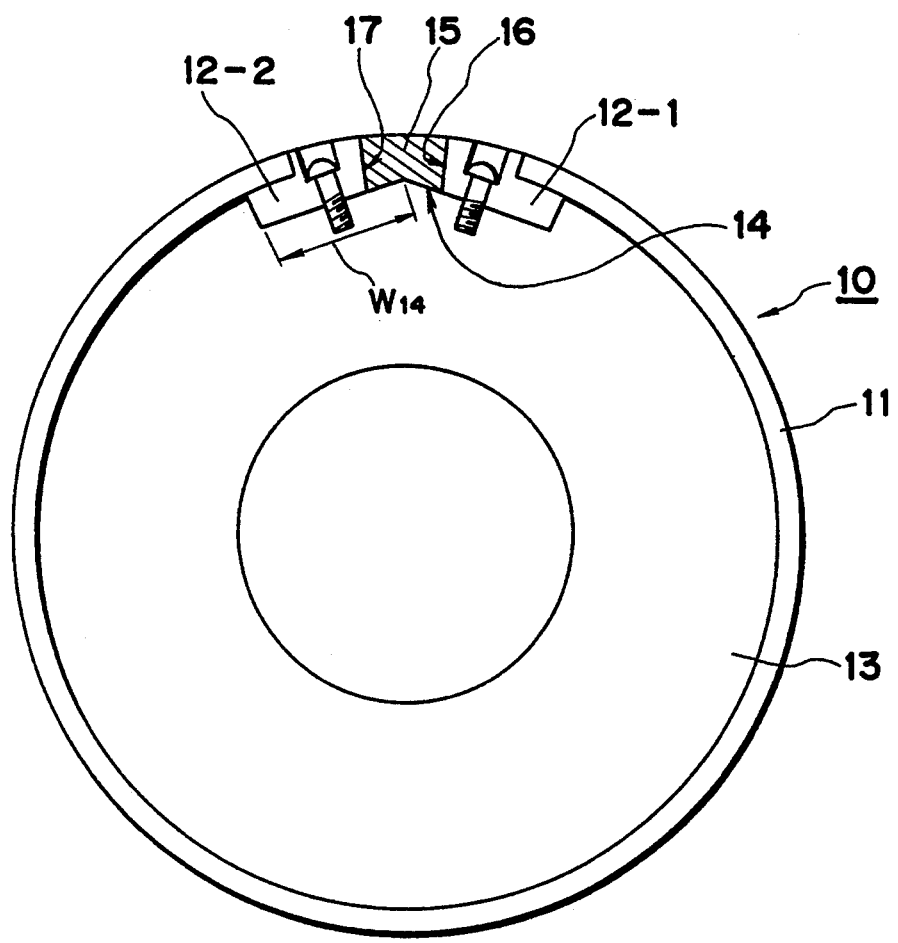
FIG. 1 is a schematic cross-sectional view of a roll stamper in accordance with an embodiment of the present invention.

FIG. 1 is a schematic cross-sectional view of a roll stamper 10 in accordance with the first embodiment of the present invention. The roll stamper 10 has a flexible stamper 11 having in its obverse surface a fine pre-format pattern of track grooves and pre-pits or the like corresponding to a pre-format. Fixing members 12-1 and 12-2 are fixed to opposite end portions of the reverse surface of the stamper 11. A roll base 13 has a circumferential surface covered with the stamper 11. An engagement groove 14 is formed in the circumferential surface of the roll base 13 so as to fittingly receive the fixing members 12. A filler 15 is provided to fill a recess formed in a circumferential surface of the roll stamper as a gap between the fixing members 12 and the engagement groove 14 so that the circumferential surface of the roll stamper 10 is substantially smooth.

In accordance with the present invention, the material of the filler is preferably a material having a thermal expansion coefficient equal to or greater than that of the material of the roll base 13, because the use of such a filler material ensures that when the roll stamper is heated at the time of formation of an information recording medium base sheet, no recess is formed between the filler and the roll base by the thermal expansion of the roll base. Also, to prevent the filler from protruding beyond the roll stamper circumferential surface by the thermal expansion thereof when the roll stamper is heated, it is preferable to set the thermal expansion of the filler to $1 \times 10^{-3}/°C$. or smaller, particularly preferably $3 \times 10^{-4}/°C$. or smaller. The filler used in accordance with the present invention is, for example, a metal or an alloy, such as Pb, Sn, Zn or solder, having a melting point in the range of 150° to 500° C., in particular, 200° to 450° C., a metallic or ceramic piece previously formed in conformity with the shape of the recess, or a heat resistant resin such as a silicone resin, an epoxy resin, a cyanoacrylate resin, a polyimide resin or a fluorine resin. A suitable filler material having a thermal expansion coefficient in the above-mentioned range and having sufficient heat resistance at the roll stamper heating temperature may be selected from these materials by considering the material of the roll base, the roll stamper heating temperature and other conditions. Sufficient heat resistance in accordance with the present invention is such that, at the roll stamper heating temperature, melting, deformation, decomposition and other mechanical physical changes are not caused at least two hours, preferably 50 hours or more.

A silicone resin or a fluorine resin among the above-mentioned various materials can be used particularly preferably as a roll stamper material, because it enables the formed resin sheet to be easily separated from the roll stamper circumferential surface. A silicone resin or an epoxy resin is also preferred, because such a resin in an unset state having a comparatively small viscosity can permeate thoroughly into small gaps in the recess during the process of filling the recess to anchor the filler on the roll stamper so that when a molten resin sheet is formed by using the roll stamper, the filler does not separate from the roll stamper, and because this resin also has high heat resistance.

A silicone resin selected in accordance with the present invention is, for example, a highly crosslinked polymer formed by polymerizing a resin having a structure represented by the following general formula (1) with a hardening agent represented by the following general formula (2):

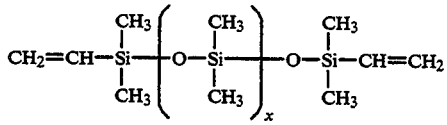
(1)

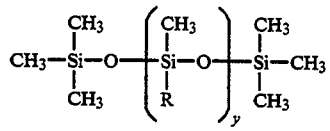
(2)

[wherein x, y are integers, and R is H, CH$_3$ or C$_2$H$_5$], or a polymer which has a structure represented by the following equation and which can be formed by polymerizing dimethyl siloxane.

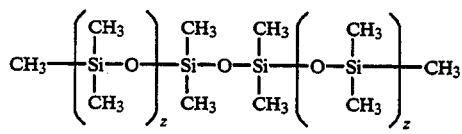
(3)

[wherein z is an integer.]

A silicone resin set by the mechanism expressed by formulae (4) to (6) shown below can also be used as the filler in accordance with the present invention. This resin can be set by being irradiated with ultraviolet rays or electron rays, and can have the viscosity at the time of filling in the recess selected as desired by being previously hardened. This resin is therefore preferred in terms of workability.

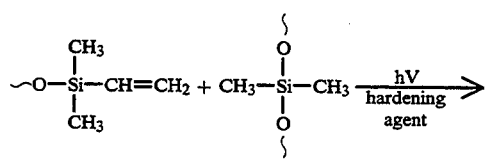
(4)

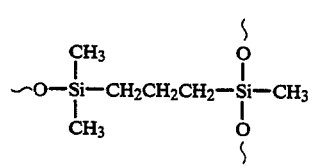

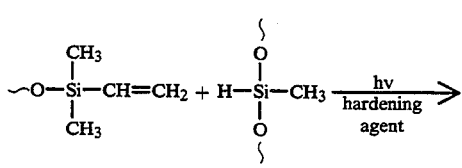
(5)

-continued

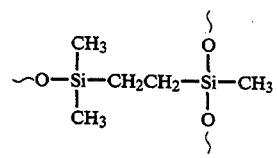

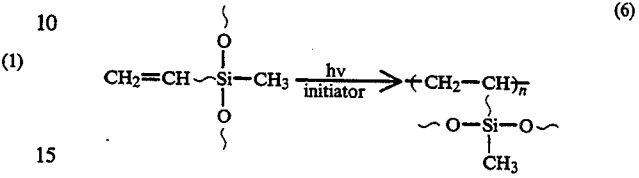
(6)

[wherein n is an integer]. In accordance with the present invention, the roller stamper recess is filled with the filler in such a manner that an unset silicone resin is injected into the recess and is then heated. Preferably, the viscosity of the unset silicone resin is set to 100 to 100,000 cps or, specifically, 1,000 to 10,000 cps by an ordinary means, e.g., adding a diluent. Occurrence of an unnecessary flow can be thereby prevented during the injection into the recess, while the resin can permeate into small gaps in the recess. After the silicone resin has been set, a part of the silicone resin protruding out of the recess is cut so that the roll stamper circumferential surface is substantially flat, thus obtaining the roll stamper in accordance with the present invention.

An epoxy resin which many be used in accordance with the present invention is, for example, a hardened material of a bisepoxy compound obtained from a polyvalent phenolic compound (e.g., bisphenol A) and epichlorohydrin. In accordance with the present invention, an epoxy resin precursor, such as a bisepoxy compound, having a viscosity of 100 cps 100,000 cps, more preferably, 1,000 to 10,000 cps is used particularly preferably. It is thereby possible to prevent occurrence of an unnecessary flow when the epoxy resin flows into the recess and to ensure that the epoxy resin can fill even very small gaps in the recess so as to prevent the set epoxy resin filler from coming off the roll stamper.

Figure 8:
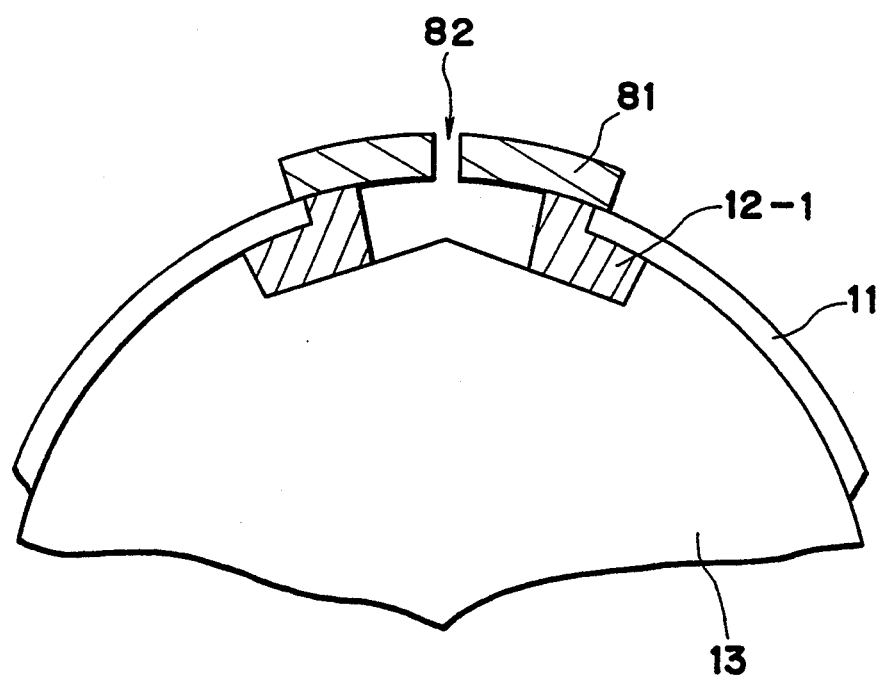
FIG. 8 is a diagram of an example of a method for manufacturing the roll stamper in accordance with the present invention.

Such an epoxy resin is one of the preferable materials in accordance with the present invention because the extent of shrinkage during setting is small. However, in general, an epoxy resin is so hard that it is difficult to work a portion of the epoxy resin protruding out of the recess. To use an epoxy resin in accordance with the present invention, therefore, a cast molding technique may be applied as described below. As shown in FIG. 8, the recess is covered with a cover member 81 worked with a curvature such as to conform to the stamper circumferential surface, and a mixture of an epoxy resin precursor and a hardening agent is injected into the cavity defined by the recess and the cover member 81 through a hole 82 of the cover member 81 to be set. It is thereby possible to easily manufacture a roll stamper having a smooth circumferential surface. This method is also effective in a case where a silicone resin or a low-melting-point metal is used as a filler. Alternatively, the process may be such that the resin is injected into the recess and the recess is thereafter covered with the cover member shown in FIG. 8 while the resin is set.

The recess in the roll stamper circumferential surface in accordance with the present invention comprises a recess having a depth greater than 100 μm from the circumferential surface of the flexible stamper. Needless to say, each of recesses of the pre-format pattern formed in the stamper surface is not regarded as the recess to be filled with the filler in accordance with the present invention. "Substantially smooth" referred to this specification denotes that the depth of the recess or the height of the convex from the roll stamper circumferential surface is 100 $\mu$m or less, more specifically, 50 $\mu$m or less.

Figure 2A:
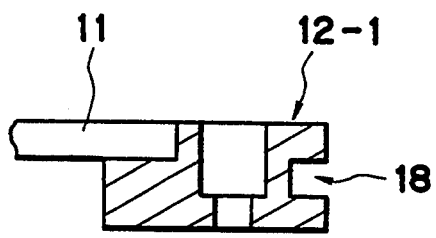
FIGS. 2A to 2F are schematic cross-sectional views of fixing members for use in the roll stamper of the present invention.
Figure 2B:
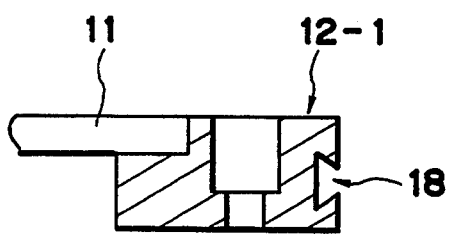

The surface roughness of at least one of side surfaces 16 and 17 of the fixing members 12-1 and 12-2 in accordance with the present invention is set to 10 $\mu$m or more, more specifically 100 $\mu$m to 1 mm to prevent the filler 15 from coming off the roll stamper. Also, a recess 18 such as that shown in FIG. 2A, 2B, or 2C may be formed in at least one of the side surfaces of the fixing members 12-1 and 12-2 to prevent the filler from coming off. Both the two side surfaces of the fixing members 12-1 and 12-2 may be formed into shapes such as those indicated at 19-1 and 19-2 in FIG. 2D to retain the filler. The filler can also be prevented from coming off by forming the fixing member 12-1 and a wall surface 19-3 of engagement groove 14, as shown in FIG. 2E, so that the recess has a shape suitable for retaining the filler. The provision of a gap between at least one of the fixing members and the roll base as shown in FIG. 2F is also effective in preventing the filler from coming off. Working the fixing member side surface in this manner is particularly preferred in a case where a heat resistant resin is used as the filler.

A roll stamper in accordance with the second embodiment of the present invention will be described below with reference to FIGS. 3 and 4.

Figure 3:
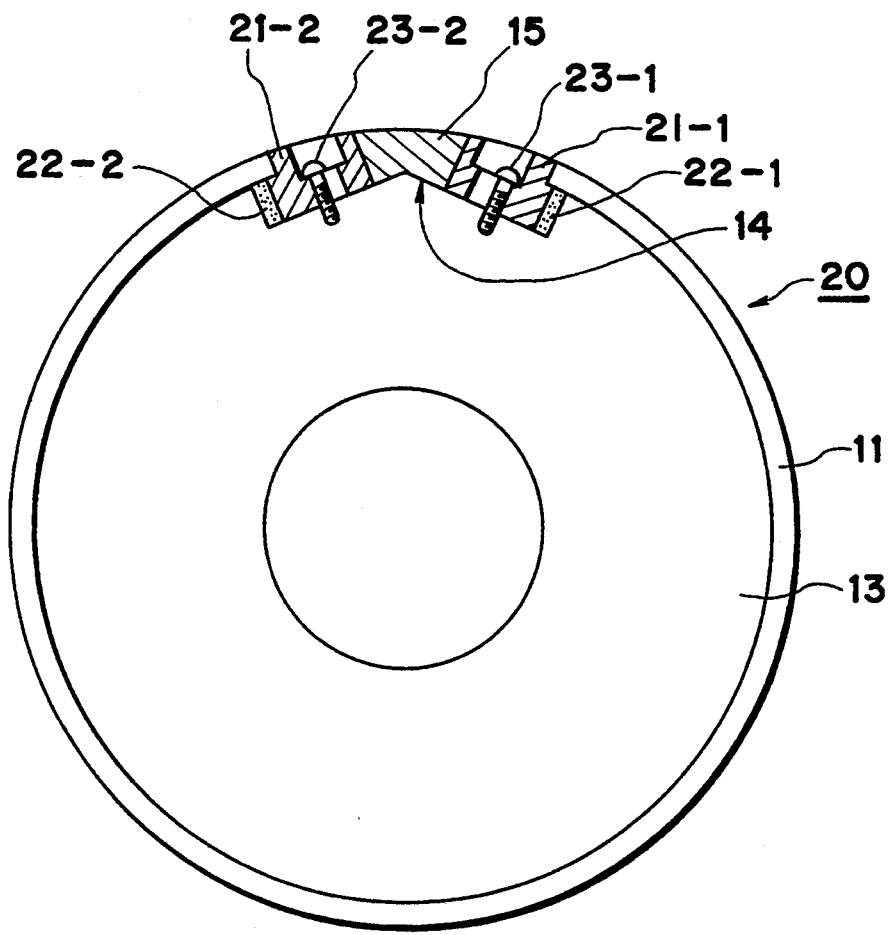
FIG. 3 is a schematic cross-sectional view of a roll stamper in accordance with a second embodiment of the present invention.
Figure 4:
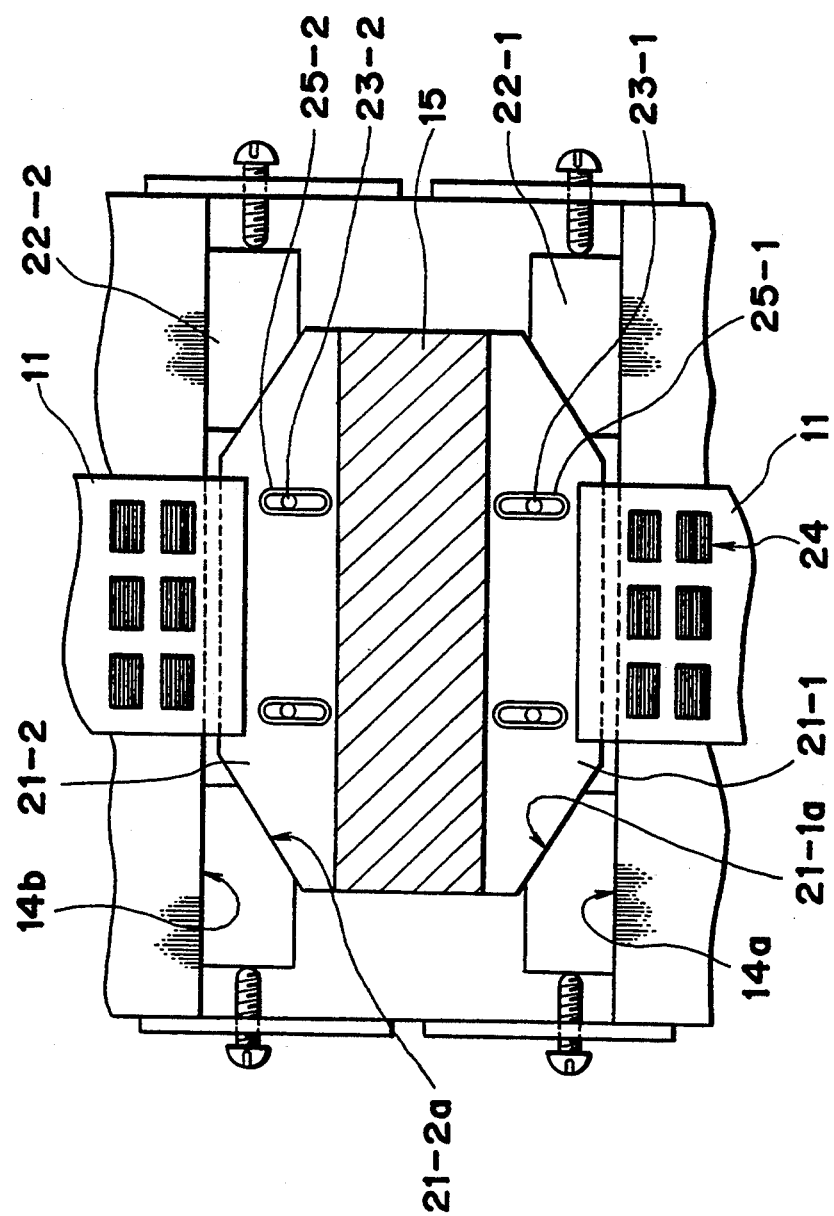
FIG. 4 is an enlarged plan view of a portion of the roll stamper shown in FIG. 3.

FIG. 3 is a cross-sectional view of the roll stamper in accordance with the second embodiment of the present invention, and FIG. 4 is a enlarged plan view of a portion of the roll stamper shown in FIG. 3 in the vicinity of a filler. Members 21-1 and 21-2 shown in FIGS. 3 and 4 are fixing members fixed to opposite end portions of the reverse surface of a flexible stamper 11. A pattern 24 corresponding to a pre-format of an information recording medium is formed in the obverse surface of the flexible stamper 11.

Holes 25-1 and 25-2 through which screws 23-1 and 23-2 for fixing the fixing members 21-1 and 21-2 to a roll base 13 are passed are elongated so that the fixing members 21-1 and 21-2 can move in the lengthwise direction of the stamper 11 when the fixing members 21-1 and 21-2 are not completely fixed to the roll base 13. Also, the holes 25-1 and 25-2 are countersunk so that head of the screws 23-1 and 23-2 do not protrude beyond the circumferential surface of the roll stamper. Wedges 22-1 and 22-2 are disposed between taper surfaces 21-1a and 21-2a of the fixing members and wall surfaces 14a and 14b of the engagement groove. The wedges 22-1 and 22-2 are moved toward a center axis line C of the roll stamper with pressing screws which are screwed into fixing members fixed on side surfaces of the roll base 13 and which contact the wedges 22-1 and 22-2. A tensile force is thereby applied to the stamper 11. These members are thus arranged to enable the stamper to closely and firmly contact the circumferential surface of the roll base. After the application of a predetermined tensile force to the stamper, the recess between the fixing members 21-1 and 21-2 is filled with filler, thus obtaining a roll stamper in accordance with the present invention.

Flexible stamper 11 used in accordance with the present invention is manufactured by an ordinary method, e.g., an electrocasting method. It is preferable to set the thickness of the stamper 11 in the range of 20 to 500 $\mu$m if the need for sufficient firmness and limiting the diameter of the roll stamper is considered.

Pre-format pattern 24 for an information recording medium to be formed in the stamper in accordance with the present invention is, for example, a pattern corresponding to a spiral groove, concentric-circle grooves or parallel grooves having a width of 1.5 to 2 $\mu$m, a pitch of 1.0 to 5 $\mu$m and a depth of about 200 to 5,000 Å provided as tracking grooves for optical disks or optical cards, or a pattern corresponding to a spiral groove, concentric-circle grooves or parallel grooves having a width of 2 to 5 $\mu$m, a pitch of 8 to 15 $\mu$m and a depth of about 200 to 5,000 Å provided as tracking grooves for optical disks or optical cards.

Preferably, the reverse surface of the stamper, more specifically, a portion of the reverse surface corresponding to an obverse surface region in which pre-format pattern 24 is formed is polished so as to be specular, i.e., to have a surface roughness of 0.1 $\mu$m or lower.

Preferably, the circumferential surface of roll base 13 used in accordance with the present invention is polished to have a surface roughness of 0.1 $\mu$m or lower. As the material of roll base 13, a material which can be polished to form a specular surface, e.g., carbon steel, Al, a hard metal, or a die steel (such as marageing steel), is preferred. Specifically, chromium steel which can easily be polished to form a specular surface is preferably used.

The roll base 13 may have an inner cavity through which a heating medium for heating the roll stamper, e.g., oil or the like, can be circulated. In this case, the thickness of roll base 13 is preferably in the range of 10 to 15 cm if the strength of the roll stamper and the limitation of the diameter of the roll stamper are considered.

Engagement groove 14 can be formed in the roll base 13 by electrical discharge machining, bite machining, dressing or the like.

A process of continuously manufacturing an information recording medium base using the roll stamper illustrated in FIG. 1 will now be described below with reference to FIG. 5.

First, resin pellets thrown into an extruder 53 are heated and melted in a barrel of extruder 53, pressurized by a screw and is formed into a sheet-like shape by T-die 54.

The temperature of the resin in this step is, for example, 260° to 330° C., more preferably, 280° to 320° C. in the case of a polycarbonate resin. A transparent resin sheet 55 in a substantially molten state is thereby extruded continuously from the T-die. The T-die is positioned so that the molten resin sheet is extruded to the gap between specular roll 52 and roll stamper 10.

Then the molten resin sheet is pinched between roll stamper 10 and specular roll 52 and between roll stamper 10 and specular roll 51 to transfer pre-format pattern 24 in the surface of the flexible stamper 11, thereby forming an information recording medium base sheet 56.

At this time, the roll stamper 10 in accordance with the present invention is maintained at a temperature such that the molten resin sheet is not solidified on the roll stamper. That is, it is preferable to heat the roll stamper up to the range of +20° to −20° C. about the thermal deformation temperature of the resin. For example, if a polycarbonate resin is formed, it is preferable to heat the surface temperature of the roll stamper to the range of 100° to 160° C. That is, in this temperature range, the molten resin sheet is not abruptly cooled, so that strain due to shrinkage or the like is not easily caused in the resin sheet. It is also preferable to set the temperature of the specular rolls 51 and 52 facing the roll stamper 10 to the same temperature as that of the roll stamper 10 or a slightly lower temperature.

The temperatures of these rolls are controlled, for example, by electric power heating through heaters cast in the rolls or by circulating a heating medium through central portions of the rolls.

As described above, in the roll stamper in accordance with the present invention which is a roll stamper used in a roller grooving process, a gap formed between fixing members and an engagement groove used to fix the stamper is filled with a filler so that the roll stamper has a substantially smooth surface, thereby enabling an information recording medium sheet having improved flatness to be formed continuously.

Also, according to the present invention, a roll stamper having a filler with improved adhesion to the roll stamper can be obtained.

EXAMPLES

The present invention will be described below in more detailed with respect to examples thereof.

Example 1

A flexible stamper 11 was manufactured by a process described below. First, a surface of a blue plate glass having a length of 34 cm, a width of 30 cm and a thickness of 10 mm was polished so as to be specular, and a 3,000 Å photoresist layer of a photoresist (commercial name: AZ-1370, a product from Nippon Hoechst Co., Ltd.) was formed on the polished surface and was pre-backed at 90° C. for 30 minutes.

Next, the photoresist was exposed to light of a pre-format pattern with a laser exposure apparatus and was developed with a developer liquid (commercial name: AZ312MIF, a product from Nippon Hoechst Co., Ltd.), thereby forming a glass original plate for forming optical disks.

The pre-format pattern was a pattern corresponding to optical disk track grooves formed in a circular area having a radius of 130 mm, each groove having a width of 0.6 $\mu$m, a pitch of 1.6 $\mu$m, and a depth of 1,000 Å. The same pre-format patterns corresponding to two optical disks were formed on one glass original plate.

In a pretreatment before forming a metallic film by electrocasting, a nickel film having a thickness of 1,000 to 2,000 Å was formed as an electroconductive layer on the glass original plate by a sputtering apparatus.

Thereafter, a metallic film of nickel having a thickness of 250 $\mu$m was formed by electrocasting on the electroconductive film formed on the glass original plate.

Finally, the electroconductive layer and the metallic film were separated as one united member from the glass original plate and the photoresist attached to the obverse surface was removed. Then the separated sheet was trimmed and the reverse surface thereof was polished and finished as a specular surface having a surface roughness of 0.1 $\mu$m, thereby manufacturing a lengthwise flexible stamper having two optical disk pre-format patterns in the obverse surface and having a length of 300 mm, a width of 150 mm and a thickness of 200 $\mu$m.

Ends of two stampers obtained in this manner were brought into abutment on each other and welded together by YAG laser and the reverse surface of the combined stamper was polished into a specular surface having a surface roughness of 0.1 $\mu$m, thereby forming a flexible stamper 11 in accordance with the present invention having a length of 600 mm, a width of 150 mm and a thickness of 200 $\mu$m and having four optical disk pre-format patterns.

A pair of fixing members 12-1 and 12-2 were formed in such a manner that stainless steel rods (SUS 304) having a rectangular cross section and having a thickness of 6 mm, a width of 13 mm and a length of 250 mm were partially rounded in conformity with the curvature and the roll base 14 and the thickness of the stamper, each rod was cut to a depth of 2 mm through a width of 5 mm from an end so as to form a step portion, and two fixing screw holes were formed in each fixing member (see FIG. 1).

Opposite end portions of the flexible stamper having the length of 600 mm were placed on the step portions of the fixing members 12-1 and 12-2 and welded to these portions by YAG laser, thereby forming a stamper with fixing members. YAG laser welding was effected by using a laser welding machine ML-2220A (a product from Miyaji Laser System K.K.) under conditions: a charging voltage of 350 V, a pulse width of 1.0 ms, an extent of defocus of 5 mm (REP-RATE (PPS): 20), and power of 50 W. Since the stamper was burred during welding, burred portions were ground so that the irregularities thereof were reduced to a size of 10 $\mu$m or less. The side surfaces 16 and 17 of the fixing members were worked so as to have a surface roughness of 15 $\mu$m.

On the other hand, the circumferential surface of a carbon steel roll base blank (thermal expansion coefficient: $11 \times 10^{-6}$/°C.) having a diameter of 200 mm and a width of 300 mm was polished into a specular surface having a surface roughness of 0.1 $\mu$m or smaller. In the circumferential surface of this roll base, an engagement groove having a depth of 6 mm, a width (W14) of 15 mm was formed, thereby completing a roll base 11.

Then, the fixing members 12-1 and 12-2 were fitted in the engagement groove 14 and were fixed with screws, and an unset silicone resin (KE 1204, a product from Shinetsu Silicone K.K.) having a viscosity of 5,000 cps was injected into the recess formed between the fixing members. Thereafter, the roll stamper was heated at 130° C. for 30 minutes to set the silicone resin, and a part of the set resin protruding out of the recess was cut off with a cutter to finish a filler having a thermal expansion coefficient of $2 \times 10^{-4}$/°C.). A roll stamper having a substantially smooth circumferential surface was thus manufactured.

Figure 5:
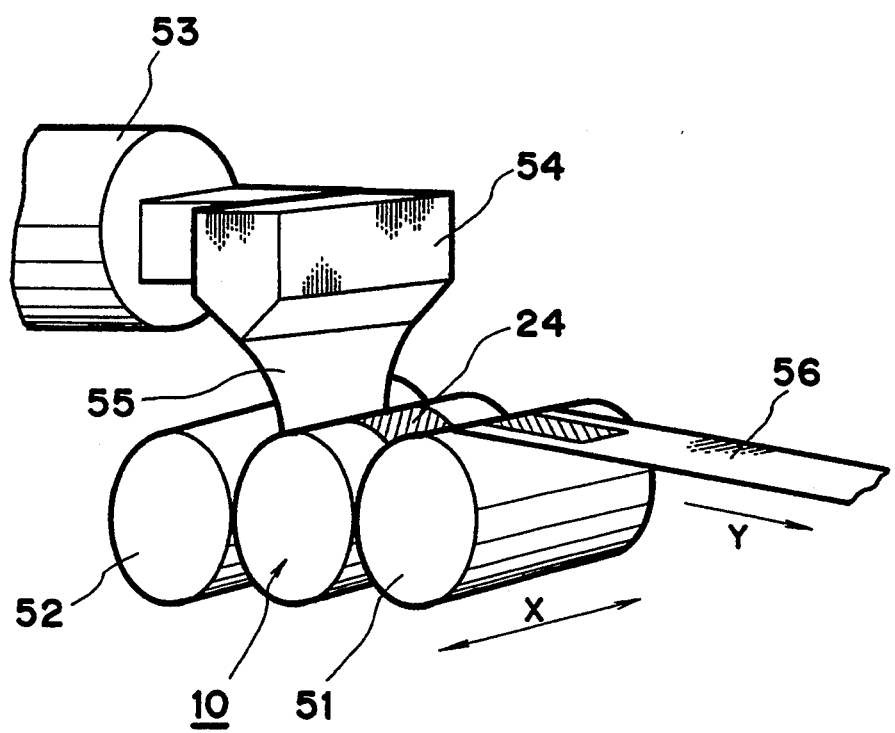
FIG. 5 is a schematic illustration of an apparatus for manufacturing an information recording medium base sheet in accordance with the present invention.
Figure 6A:
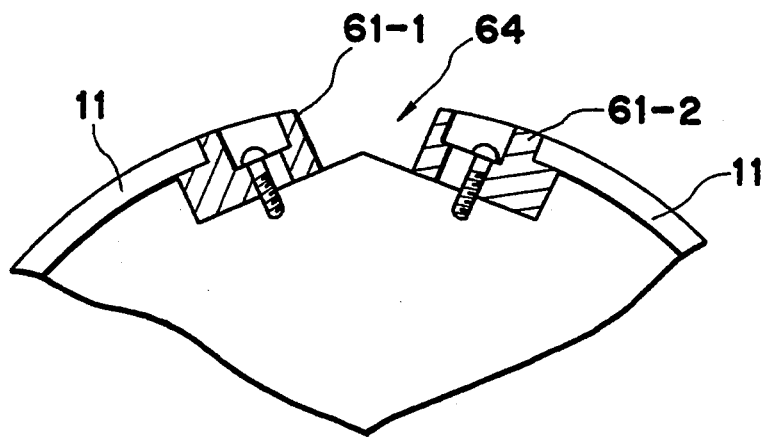
FIGS. 6A and 6B are schematic cross-sectional views of conventional roll stampers.
Figure 6B:
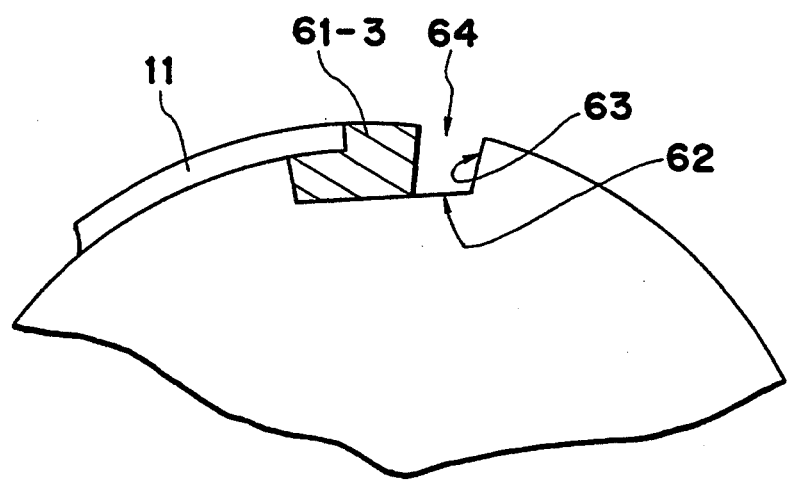
Figure 7:
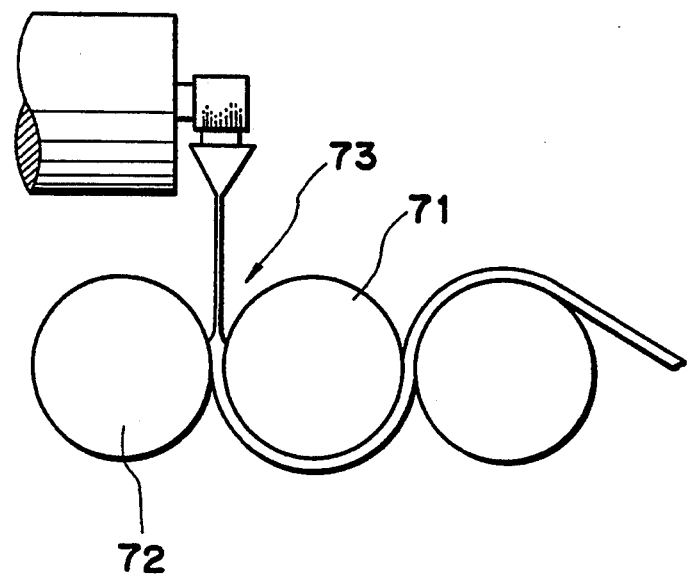
FIG. 7 is a schematic cross-sectional view of a conventional information recording medium base.

This roll stamper was attached to a molding machine such as that shown in FIG. 5, and a polycarbonate resin was extruded from extruder 53. An optical disk base sheet having a thickness of 1.2 mm was thereby manufactured. The molding was continuously performed under conditions: a T-die temperature of 300° C., a roll stamper surface temperature of 145° C., and a resin sheet transport speed of 3 m/min. The thickness of the optical disk base sheet formed in this manner was 1.2 mm and pre-format patterns were precisely transferred to it. The height of protrusions of the base sheet corresponding to the filled gap between the fixing members was at most 80 μm. Thus, the obtained continuous sheet had improved flatness.

No part of the filler moved from the roll stamper to the formed resin sheet during the molding.

In testing for the present invention, the thermal expansion coefficient was measured in conformity with ASTM D 646.

Example 2

A lengthwise stamper 11 with fixing members was manufactured in the same manner as Example 1. A lead plate having a thickness of 2 mm, a height of 6 mm and a length of 30 cm was fitted in the recess between fixing member 12-1 and 12-2 fixed (about 2 mm) with screws in a fixation groove 14 formed in a roll base 13, and was pressed downward to fill the gap. The protruding portion of the lead plate was cut off with a cutter, so that the maximum of the change in the height of the roll stamper circumferential surface was 50 μm.

An optical disk base sheet having a thickness of 1.2 mm was continuously formed by using the stamper roll manufactured in this manner and by the same process as Example 1. Pre-format patterns were thereby transferred precisely. The height of protrusions of the base sheet was at most 30 μm; the obtained continuous sheet had improved flatness. Also, there was no problem in a process of continuously forming an organic pigment recording layer by application with a roll coater.

Example 3

A filler member formed of a stainless steel (SUS 430) and having a length of 30 cm was previously formed so as to conform to the recess in a roll stamper manufactured in the same manner as Example 1. This fitted member was fitted in the recess and fixed to a roll base 13 with screws passing through holes formed in opposite end portions of the filler member. The roll stamper was finished by polishing the upper surface of the filler member with a curvature coinciding with that of the circumferential surface of the roll stamper so that the change in the height of the roll stamper circumferential surface was 10 μm or less.

An optical disk base sheet was formed by using the stamper roll manufactured in this manner and by the same process as Example 1. The pre-format transfer performance was good. The change in the height of the sheet surface due to the difference between the heights of the fixing members, the stamper and the filler was at most 10 μm. Also, there was no problem due to this change in a process of forming an organic pigment recording layer by wet-application with a roll coater.

Comparative Example 1

A stamper with fixing members was manufactured in the same manner as Example 1. In the step of cutting the filler, filler was cut deep, so that the change in the height of the roll stamper circumferential surface was 120 μm.

An optical disk base sheet having a thickness of 1.2 mm was formed by using the roll stamper manufactured in this manner and by the same process as Example 1. In some case, the resin entered in the groove at the filler so that the base sheet was excessively tensed when separated from the roll stamper, resulting in a deformation in the sheet.

Comparative Example 2

A stamper with fixing members was manufactured in the same manner as Example 2. After fixing the stamper on a roll base with screws, a lead plate was also press-fitted. This stamper was used to form a base sheet without cutting the lead plate protruding to an extent of about 110 μm. As a result, bank non-uniformity occurred and a deformation occurred in the base sheet surface like a detect due to flow non-uniformity. The portion of this sheet corresponding to the filled portion of the stamper had a thickness smaller by about 100 μm than the thickness of the other portion.

During a process of forming a recording layer by application with a roll coater, the sheet was vibrated by the recess, resulting in non-uniformity of the thickness.

Example 4

Figure 2C:
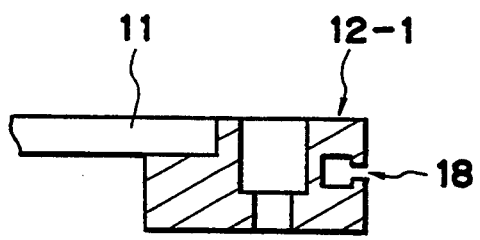
Figure 2D:
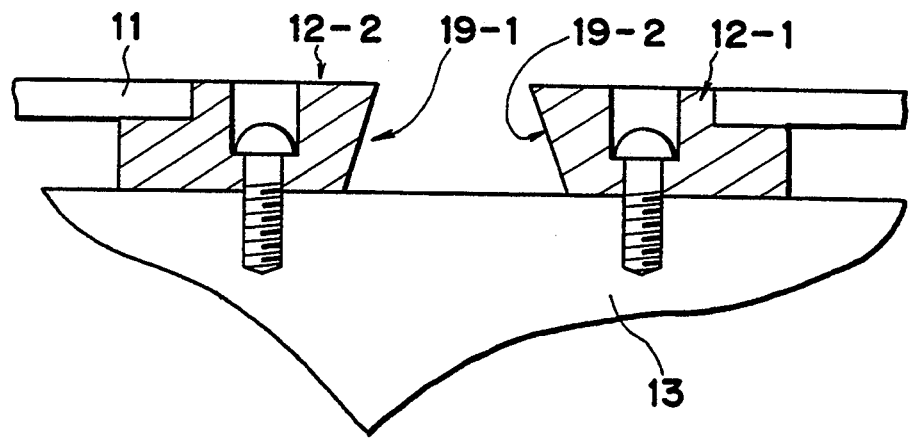
Figure 2E:
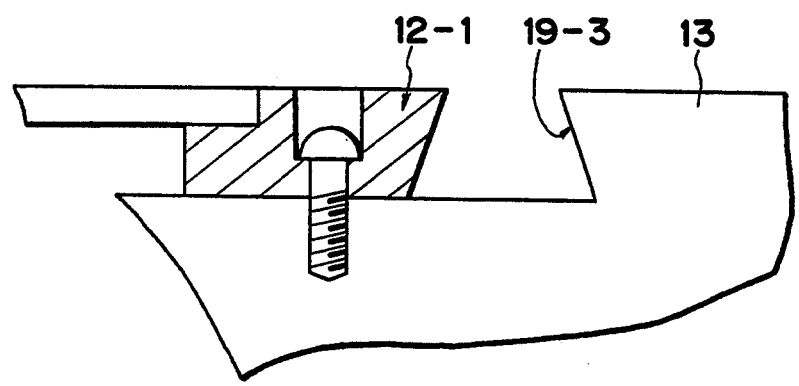
Figure 2F:
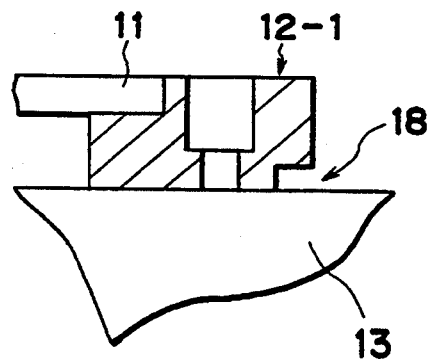

Fixing members 12-1 and 12-2 each having a recess, such as that shown in FIG. 2C, formed in its side surface 16 or 17 were attached to a flexible stamper manufactured in the same manner as Example 1. An unset epoxy resin precursor (EPIKOTE 828, a product from Yuka Shell Epoxy K.K.) having a viscosity of 2,500 cps was injected as a filler material, instead of the silicone resin, into a recess covered with a member having a shape such as to closely contact the circumferential surface of the roll stamper (see FIG. 8). Then, the roll stamper was heated at 120° C. to set the resin to form a filler having a thermal expansion coefficient of $7.2 \times 10^{-5}$/°C. A roll stamper having a smooth circumferential surface was thereby manufactured.

An optical disk base sheet was formed by using the stamper roll manufactured in this manner and by the same process as Example 1. The pre-format transfer performance was good and the degree of flatness of the base sheet was sufficiently high. Also, the filler did not come off the roll stamper during the molding.

Reference Example 1

A roll stamper was manufactured in the same manner as Example 1 except that side surfaces 16 and 17 of fixing members 12-1 and 12-2 were worked so as to have a surface roughness of about 1 μm or smaller. An optical disk base sheet was formed by using this roll stamper and by the same process as Example 1. The pre-format pattern transfer performance was good and the degree of flatness of the base sheet was sufficiently high, that is, the change in the height was at most 80 μm. However, the filler came off the roll stamper during the molding to cause a deterioration in the flatness of the base sheet.

What is claimed is:

1. A roll stamper for forming an information recording medium base sheet, comprising;
   a stamper member having a pattern corresponding to a pre-format pattern of an information recording medium in a surface of said stamper member;
   fixing members fixed on opposite end portions of a reverse surface of said stamper member so as to be integral with said stamper member;
   a specular roll base having a plurality of engagement grooves formed in a circumferential surface parallel to its axis in which grooves said fixing member can be respectively fitted; and
   said stamper member being fixed on said specular roll base by respectively fitting said fixing members in said engagement grooves, said stamper member being placed along the circumferential surface of said specular roll base;
   wherein a recess in a circumferential surface of the roll stamper including a gap between said fixing members and said engagement grooves is filled with a filler so that the roll stamper circumferential surface is substantially smooth, and said filler is formed of a material having a thermal expansion coefficient larger than the thermal expansion coefficient of the material of said roll base.

2. A roll stamper according to claim 1, wherein a side surface of at least one of said fixing members is formed so as to be capable of retaining said filler.

3. A roll stamper according to claim 1, wherein a side surface of at least one of said fixing members is formed so as to have a surface roughness of 10 μm or greater.

4. A roll stamper according to claim 1, wherein a recess capable of retaining said filler is formed in a side surface of at least one of said fixing members.

5. A roll stamper according to claim 1, wherein said filler is formed of a material having a thermal expansion coefficient of $1 \times 10^{-3}/°$ C. or smaller.

6. A roll stamper according to claim 1, wherein said filler comprises a heat resistant resin.

7. A roll stamper according to claim 6, wherein said filler comprises a silicone resin.

8. A roll stamper according to claim 7, wherein said filler comprises a set material of a silicone resin having a viscosity of 100 to 100,000 cps in an unset state.

9. A roll stamper according to claim 8, wherein said filler comprises a set material of a silicone resin having a viscosity of 1,000 to 10,000 cps in an unset state.

10. A roll stamper according to claim 6, wherein said filler comprises an epoxy resin.

11. A roll stamper according to claim 10, wherein said filler comprises a set material of an epoxy resin precursor having a viscosity of 100 to 100,000 cps in an unset state.

12. A roll stamper according to claim 11, wherein said filler comprises a set material of an epoxy resin precursor having a viscosity of 1,000 to 10,000 cps in an unset state.

13. A roll stamper for forming an information recording medium base sheet, comprising;
a stamper member having a pattern corresponding to a pre-format pattern of an information recording medium in a surface of said stamper member;
fixing members fixed on opposite end portions of a reverse surface of said stamper member so as to be integral with said stamper member;
a specular roll base having a plurality of engagement grooves formed in a circumferential surface parallel to its axis in which grooves said fixing member can be respectively fitted; and
said stamper member being fixed on said specular roll base by respectively fitting said fixing members in said engagement grooves, said stamper member being placed along the circumferential surface of said specular roll base;
wherein a recess in a circumferential surface of the roll stamper including a gap between said fixing members and said engagement grooves is filled with a filler so that the roll stamper circumferential surface is substantially smooth and said filler is formed of a material having a thermal expansion coefficient of $1 \times 10^{-3}/°$ C. or smaller.

14. A roll stamper according to claim 13, wherein a side surface of at least one of said fixing members is formed so as to be capable of retaining said filler.

15. A roll stamper according to claim 13, wherein a side surface of at least one of said fixing members is formed so as to have a surface roughness of 10 μm or greater.

16. A roll stamper according to claim 13, wherein a recess capable of retaining said filler is formed in a side surface of at least one of said fixing members.

17. A roll stamper for forming an information recording medium base sheet, comprising;
a stamper member having a pattern corresponding to a pre-format pattern of an information recording medium in a surface of said stamper member;
fixing members fixed on opposite end portions of a reverse surface of said stamper member so as to be integral with said stamper member;
a specular roll base having a plurality of engagement grooves formed in a circumferential surface parallel to its axis in which grooves said fixing member can be respectively fitted; and
said stamper member being fixed on said specular roll base by respectively fitting said fixing members in said engagement grooves, said stamper member being placed along the circumferential surface of said specular roll base;
wherein a recess in a circumferential surface of the roll stamper including a gap between said fixing members and said engagement grooves is filled with a filler so that the roll stamper circumferential surface is substantially smooth, and wherein
said filler comprises a heat resistant resin, said heat resistant resin being a set material of a silicone resin having a viscosity of 100 to 100,000 cps in an unset state.

18. A roll stamper according to claim 17, wherein a side surface of at least one of said fixing members is formed so as to be capable of retaining said filler.

19. A roll stamper according to claim 17, wherein a side surface of at least one of said fixing members is formed so as to have a surface roughness of 10 μm or greater.

20. A roll stamper according to claim 17, wherein a recess capable of retaining said filler is formed in a side surface of at least one of said fixing members.

21. A roll stamper for forming an information recording medium base sheet, comprising;
a stamper member having a pattern corresponding to a pre-format pattern of an information recording medium in a surface of said stamper member;
fixing members fixed on opposite end portions of a reverse surface of said stamper member so as to be integral with said stamper member;
a specular roll base having a plurality of engagement grooves formed in a circumferential surface parallel to its axis in which grooves said fixing member can be respectively fitted; and
said stamper member being fixed on said specular roll base by respectively fitting said fixing members in said engagement grooves, said stamper member being placed along the circumferential surface of said specular roll base;
wherein a recess in a circumferential surface of the roll stamper including a gap between said fixing members and said engagement grooves is filled with a filler so that the roll stamper circumferential surface is substantially smooth, and wherein
said filler comprises a heat resistant resin, said heat resistant resin being a set material of a silicone resin having a viscosity of 1,000 to 10,000 cps in an unset state.

22. A roll stamper according to claim 21, wherein a side surface of at least one of said fixing members is formed so as to be capable of retaining said filler.

23. A roll stamper according to claim 21, wherein a side surface of at least one of said fixing members is formed so as to have a surface roughness of 10 μm or greater.

24. A roll stamper according to claim 21, wherein a recess capable of retaining said filler is formed in a side surface of at least one of said fixing members.

25. A roll stamper for forming an information recording medium base sheet, comprising;
    a stamper member having a pattern corresponding to a pre-format pattern of an information recording medium in a surface of said stamper member;
    fixing members fixed on opposite end portions of a reverse surface of said stamper member so as to be integral with said stamper member;
    a specular roll base having a plurality of engagement grooves formed in a circumferential surface parallel to its axis in which grooves said fixing member can be respectively fitted; and
    said stamper member being fixed on said specular roll base by respectively fitting said fixing members in said engagement grooves, said stamper member being placed along the circumferential surface of said specular roll base;
    wherein a recess in a circumferential surface of the roll stamper including a gap between said fixing members and said engagement grooves is filled with a filler so that the roll stamper circumferential surface is substantially smooth, and wherein
    said filler comprises a heat resistant resin, said heat resistant resin comprises a set material of an epoxy resin precursor having a viscosity of 100 to 100,000 cps in an unset state.

26. A roll stamper according to claim 25, wherein a side surface of at least one of said fixing members is formed so as to be capable of retaining said filler.

27. A roll stamper according to claim 25, wherein a side surface of at least one of said fixing members is formed so as to have a surface roughness of 10 μm or greater.

28. A roll stamper according to claim 25, wherein a recess capable of retaining said filler is formed in a side surface of at least one of said fixing members.

29. A roll stamper for forming an information recording medium base sheet, comprising;
    a stamper member having a pattern corresponding to a pre-format pattern of an information recording medium in a surface of said stamper member;
    fixing members fixed on opposite end portions of a reverse surface of said stamper member so as to be integral with said stamper member;
    a specular roll base having a plurality of engagement grooves formed in a circumferential surface parallel to its axis in which grooves said fixing member can be respectively fitted; and
    said stamper member being fixed on said specular roll base by respectively fitting said fixing members in said engagement grooves, said stamper member being placed along the circumferential surface of said specular roll base;
    wherein a recess in a circumferential surface of the roll stamper including a gap between said fixing members and said engagement grooves is filled with a filler so that the roll stamper circumferential surface is substantially smooth, and wherein
    said filler comprises a heat resistant resin, said heat resistant resin comprises a set material for an epoxy resin precursor having a viscosity of 100 to 10,000 cps in an unset state.

30. A roll stamper according to claim 29, wherein a side surface of at least one of said fixing members is formed so as to be capable of retaining said filler.

31. A roll stamper according to claim 29, wherein a side surface of at least one of said fixing members is formed so as to have a surface roughness of 10 μm or greater.

32. A roll stamper according to claim 29, wherein a recess capable of retaining said filler is formed in a side surface of at least one of said fixing members.

* * * * *

UNITED STATES PATENT AND TRADEMARK OFFICE
CERTIFICATE OF CORRECTION

PATENT NO. : 5,383,834

DATED : January 24, 1995

INVENTORS : OSAMU KANOME ET AL.

Page 1 of 3

It is certified that error appears in the above-identified patent and that said Letters Patent is hereby corrected as shown below:

ON THE TITLE PAGE

At [56] References Cited

Under "U.S. PATENT DOCUMENTS" insert

```
--2,529,083  11/1950  Keefe     ............18/21
  3,072,519   1/1963  Salzman   ...........156/200
  3,768,946  10/1973  Matuschka .........425/363
  4,790,893  12/1988  Watkins   ...........156/232
  4,836,874   6/1989  Foster    ...........156/209
  4,965,118  10/1990  Kodera et al. .....428/137
  4,968,370  11/1990  Watkins   ...........156/232--.
```

Under "FOREIGN PATENT DOCUMENTS" insert

```
--1300850   8/1969   Germany
  976932   12/1964   Great Britain
  325846   11/1975   Germany
  1467972  12/1965   France--.
```

UNITED STATES PATENT AND TRADEMARK OFFICE
CERTIFICATE OF CORRECTION

PATENT NO. : 5,383,834

DATED : January 24, 1995

INVENTORS : OSAMU KANOME ET AL.

It is certified that error appears in the above-identified patent and that said Letters Patent is hereby corrected as shown below:

COLUMN 6

Line 17, "integer].In" should read --integer].  In--.

COLUMN 7

Line 36, "a" (first occurrence) shuold read --an--.

COLUMN 12

Line 5, "detect" should read --defect--.
Line 48, "comprising;" should read --comprising:--.
Line 57, "member" should read --members--.

COLUMN 13

Line 38, "comprising;" should read --comprising:--.
Line 47, "member" should read --members--.

COLUMN 14

Line 5, "comprising;" should read --comprising:--.
Line 14, "member" should read --members--.
Line 41, "comprising;" should read --comprising--.
Line 50, "member" should read --members--.

UNITED STATES PATENT AND TRADEMARK OFFICE
CERTIFICATE OF CORRECTION

PATENT NO. : 5,383,834

DATED : January 24, 1995

INVENTORS : OSAMU KANOME ET AL.

COLUMN 15

Line 9, "comprising;" should read --comprising:--.
Line 18, "member" should read --members--.

COLUMN 16

Line 5, "comprising;" should read --comprising:--.
Line 14, "member" should read --members--.

Signed and Sealed this

Thirteenth Day of June, 1995

Attest:

BRUCE LEHMAN

Attesting Officer          Commissioner of Patents and Trademarks